(12) United States Patent
Matsutani

(10) Patent No.: US 7,387,044 B2
(45) Date of Patent: Jun. 17, 2008

(54) SHIFT LEVER ASSEMBLY

(75) Inventor: Yo Matsutani, Ashikaga (JP)

(73) Assignee: Calsonic Kansei Corporation (JP)

( * ) Notice: Subject to any disclaimer, the term of this patent is extended or adjusted under 35 U.S.C. 154(b) by 410 days.

(21) Appl. No.: 10/800,453

(22) Filed: Mar. 15, 2004

(65) Prior Publication Data

US 2004/0237691 A1    Dec. 2, 2004

(30) Foreign Application Priority Data

Mar. 14, 2003    (JP)    ............... P2003-069812

(51) Int. Cl.
*B60K 20/00*    (2006.01)

(52) U.S. Cl. .................... 74/473.3; 74/473.1

(58) Field of Classification Search ........... 74/473.3, 74/473.1, 473.36; 296/193.02, 70, 208, 72; 180/336; 248/225.11, 228.1
See application file for complete search history.

(56) References Cited

U.S. PATENT DOCUMENTS

| | | | | |
|---|---|---|---|---|
| 2,884,802 A * | 5/1959 | Loofbourrow | ............. | 74/473.3 |
| 3,177,737 A * | 4/1965 | Williams et al. | ........... | 74/471 R |
| 3,192,793 A * | 7/1965 | Hurst, Jr. et al. | ............ | 74/473.3 |
| 3,250,145 A * | 5/1966 | James | ...................... | 74/473.3 |
| 3,465,559 A * | 9/1969 | Rhodes et al. | ................ | 70/248 |
| 6,286,385 B1 * | 9/2001 | Nishimura et al. | ......... | 74/473.3 |
| 6,461,073 B1 * | 10/2002 | Ikegami | ...................... | 403/375 |
| 6,526,842 B1 * | 3/2003 | Tanaka et al. | .............. | 74/473.1 |
| 6,568,295 B2 * | 5/2003 | Matsuno et al. | ............ | 74/473.3 |
| 6,988,764 B2 * | 1/2006 | Matsutani | .............. | 296/193.02 |
| 7,086,306 B2 * | 8/2006 | Syamoto et al. | .......... | 74/473.33 |

FOREIGN PATENT DOCUMENTS

| | | |
|---|---|---|
| JP | 5-280621 | 10/1993 |
| JP | 09-030281 | 2/1997 |
| JP | 2000-025479 | 1/2000 |
| JP | 2000-168392 | 6/2000 |

OTHER PUBLICATIONS

Merriam-Webster's Collegiate Dictionary, 1998, Tenth Edition, "Circumference".*

* cited by examiner

*Primary Examiner*—Richard W L Ridley
*Assistant Examiner*—Terence Boes
(74) *Attorney, Agent, or Firm*—Kilpatrick Stockton LLP

(57) ABSTRACT

A shift lever assembly includes a cross-car-beam. The assembly includes a shift lever supported by the cross-car-beam. The assembly includes a fitting fixing the shift lever to the cross-car-beam. The fitting includes a base for inserting the shift lever therein. The fitting includes a first wall fixed to the cross-car-beam. The fitting includes a second wall extending from the base transversely of the first wall and fixed to the cross-car-beam.

4 Claims, 7 Drawing Sheets

FIG.2
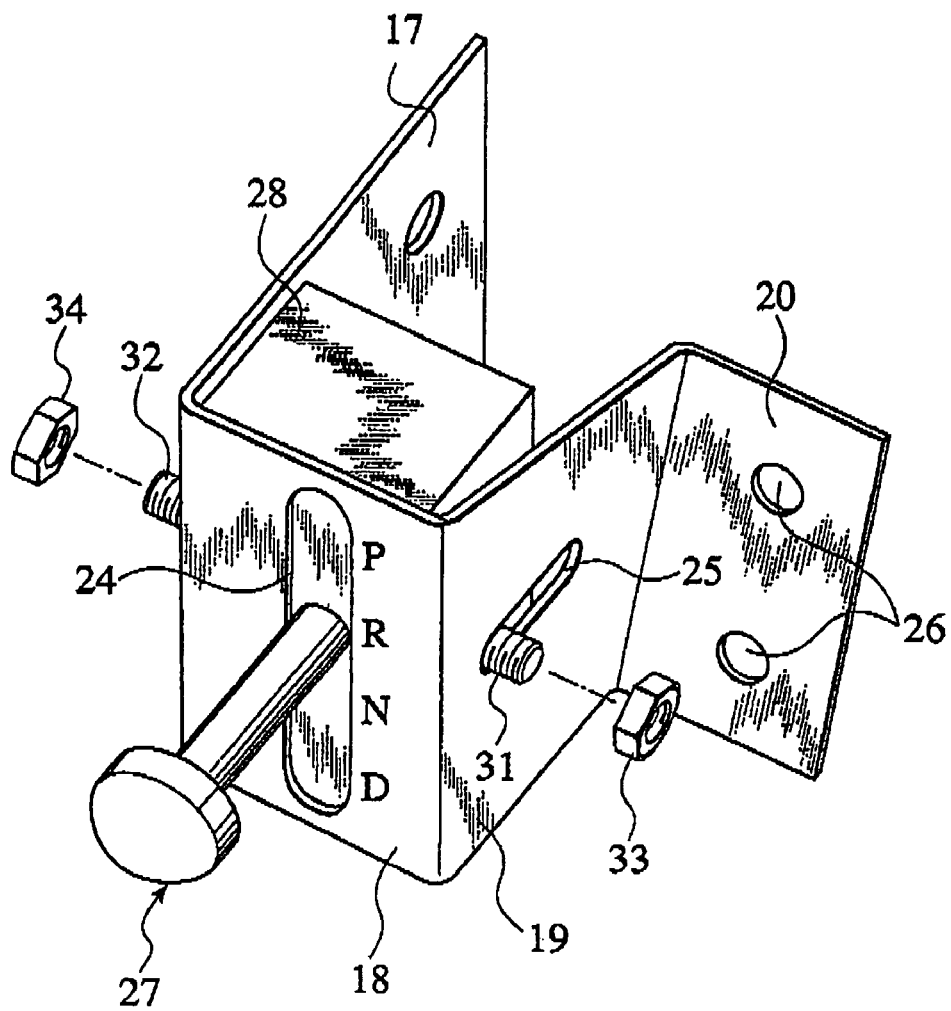
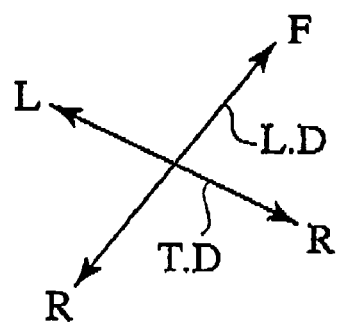

SHIFT LEVER ASSEMBLY

CROSS-REFERENCE TO RELATED APPLICATIONS

This application is based upon and claims the benefit of priority from Japanese Patent Application No. 2003-069812 filed on Mar. 14, 2003; the entire contents of which are incorporated herein by reference.

BACKGROUND OF THE INVENTION

The present invention relates to a shift lever assembly. Specifically, the present invention relates to a shift lever fitting structure which efficiently receives and absorbs an excessive impact load inputted to a shift lever during vehicle crash and the like.

When a shift lever is fitted to a vehicle body, the shift lever is fixed to a cross car-beam by use of a steel bracket. This bracket is formed in an approximately U-shaped cross section. The bracket has both side walls which extend in a vehicle longitudinal direction and are supported by the cross-car-beam (see Japanese Patent Laid-Open Publication No. Hei 5-280621, for example).

SUMMARY OF THE INVENTION

However, the steel bracket has a heavy weight and therefore this leads to an increase of vehicle weight. A bracket made of synthetic resin has a light weight but requires an increased thickness to maintain rigidity. This may increase manufacturing costs.

The present invention provides a shift lever assembly light in weight and capable of efficiently absorbing an excessive load.

The invention has a first aspect directed to the following shift lever assembly. The assembly includes a cross-car-beam. The assembly includes a shift lever device supported by the cross-car-beam. The assembly includes a fitting fixing the shift lever device to the cross-car-beam. The fitting includes a base for inserting the shift lever device therein. The fitting includes a first wall fixed to the cross-car-beam. The fitting includes a second wall extending from the base transversely of the first wall and fixed to the cross-car-beam.

The cross-car-beam includes a support. The support may include a first fitting wall fitted with the first wall. The support may include a second fitting wall fitted with the second wall.

The base may include a third wall extending from the first wall. The base may include a fourth wall interconnecting the second wall and the third wall and extending side-by-side with the third wall. The first wall and the fourth wall define elongated holes. The shift lever includes a device enclosed by the first wall, second wall and the base. The device includes a shaft inserted in the elongated holes.

The shaft may be slidable in the elongated holes.

The shaft is fitted in ends of elongated holes. The elongated holes have remains to prevent the shaft from being inserted.

The first wall, the second wall, and the base may be integrated with each other.

The cross-car-beam includes a rib along a circumference thereof. The rib may have the support thereon.

The invention has a second aspect directed to the following shift lever assembly. The assembly includes a cross-car-beam extending in a vehicle transverse direction and including a support. The assembly includes a shift lever device fixed to the support by a fitting. The fitting includes a longitudinal wall extending in a vehicle longitudinal direction. The fitting includes a transverse wall extending in the vehicle transverse direction. The fitting includes a connecting wall interconnecting the longitudinal wall and the transverse wall. The support includes a longitudinal fitting wall opposed to the longitudinal wall. The support includes a transverse fitting wall opposed to the transverse wall. The longitudinal wall and the transverse wall are fixed to the support.

The connecting well includes a rear wall continuous with a rear end of the longitudinal wall. The connecting wall includes a side wall continuous with an inner side end of the transverse wall in the vehicle transverse direction and being opposed to the longitudinal wall. The shift lever device includes a device body positioned in an inside enclosed by the longitudinal wall, the transverse wall, and the connecting wall. The longitudinal wall and the side wall of the connecting wall define elongated holes extending in the vehicle longitudinal direction. The device body has fitting shafts protruding therefrom in the vehicle transverse direction. The fitting shafts are fitted in the elongated holes, fixing the device body to the fitting.

The elongated holes have the rear ends with a width substantially identical to sizes of the fitting shafts. The elongated holes have front sides in front of the rear ends in the vehicle longitudinal direction. The front sides are narrower in width than the rear ends. The fitting shafts are fitted in the rear ends of the elongated holes.

The longitudinal wall, the transverse wall, and the connecting wall may be integrated with each other.

The cross-car-beam includes a rib in a circumferential direction. The support is provided on the rib.

BRIEF DESCRIPTION OF THE ACCOMPANYING DRAWINGS

FIG. 2 is an enlarged perspective view showing a structure in which a shift lever device is arranged in the fitting of FIG. 1.

In the Figures, V.D indicates a vehicle longitudinal direction, F indicates vehicle front, and R indicates vehicle rear. L.D indicates a vehicle transverse direction, L indicates vehicle left thereof, and R indicates vehicle right.

DETAILED DESCRIPTION OF THE PREFERRED EMBODIMENTS

The embodiment of the invention will be described with reference to the drawings.

Figure 1:
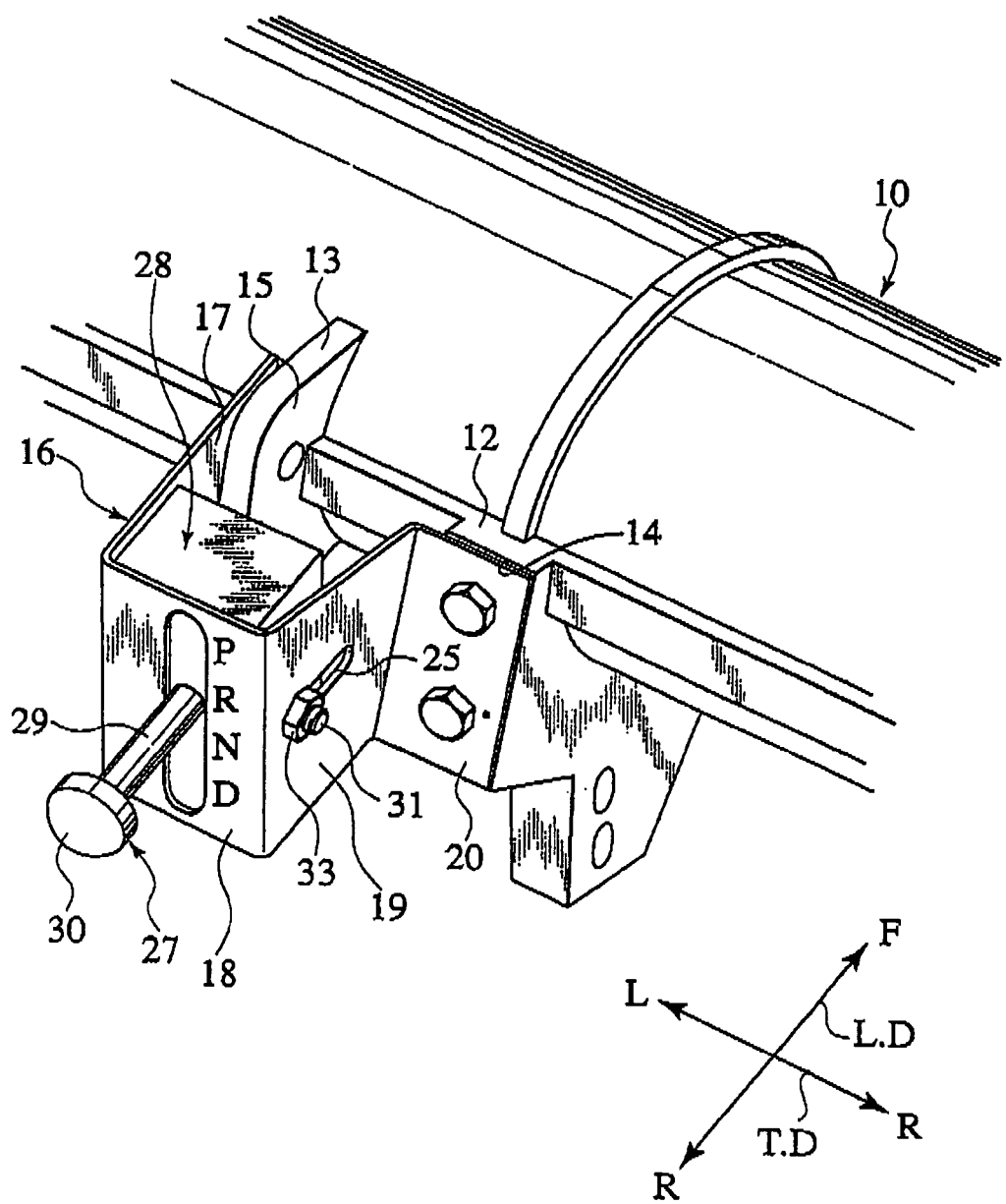
FIG. 1 is a perspective view showing a shift lever assembly according to an embodiment of the present invention.

Referring to FIG. 1, a shift lever assembly includes a cross-car-beam 10 extending in a vehicle transverse direction. The cross-car-beam includes a first support 12 and a second support 13 thereon. The shift lever assembly includes a shift lever 27 provided to cross-car-beam 10 using a fitting 16. The fitting 16 includes a transverse wall 20 or a second wall fastened with bolts to a transverse fitting face 14 or a second fitting face of first support 12. The fitting 16 includes a longitudinal wall 17 or a first wall fastened with bolts to a longitudinal fitting face 15 or a first fitting face of second support 13. The shift lever 27 includes a rod 29 vertically slidably supported by a device body 28. The shift lever 27 includes a knob 30 at the end of rod 29.

Figure 3:
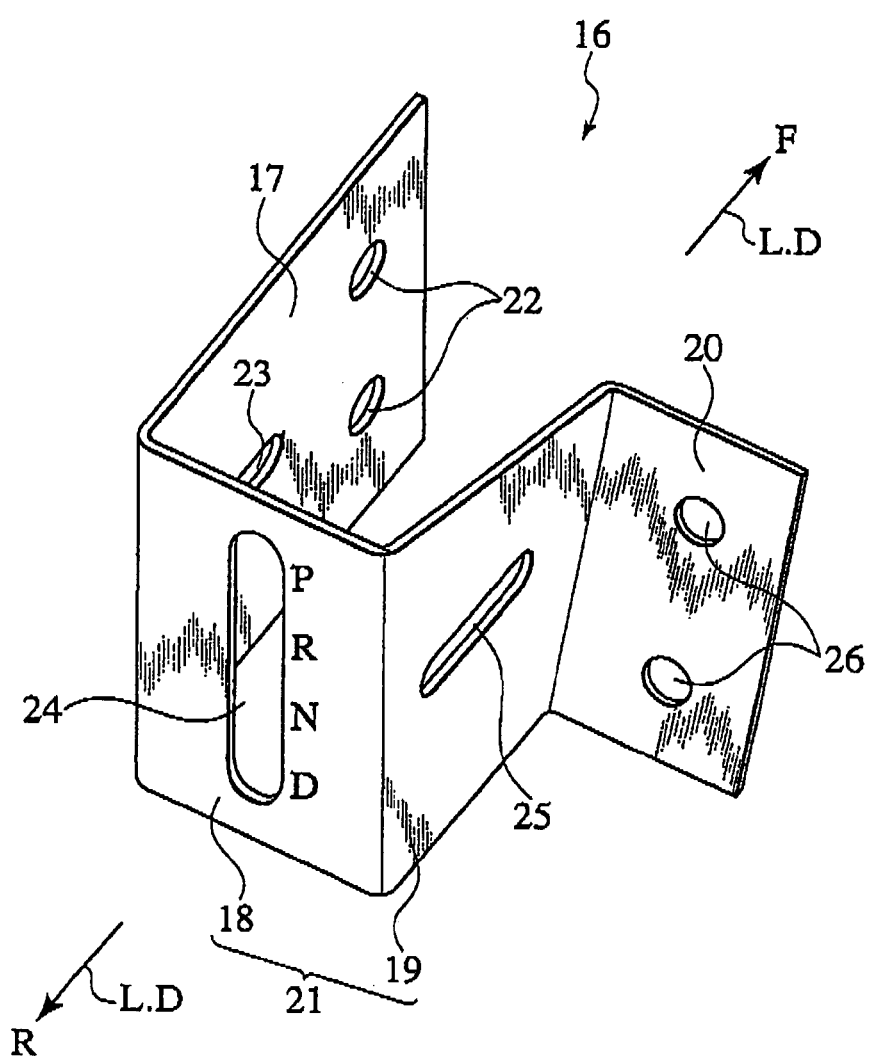
FIG. 3 is an enlarged perspective view showing the fitting of FIG. 2.

Referring to FIGS. 2 and 3, the fitting 16 includes longitudinal wall 17 extending in the vehicle longitudinal direction. The longitudinal wall 17 faces longitudinal fitting face 15. The fitting 16 includes a rear wall 18 or a third wall, extending right from the end of longitudinal wall 17 closer to vehicle rear. The fitting 16 includes a side wall 19 or a fourth wall extending right from the end of rear wall 18 closer to vehicle front. The fitting 16 includes transverse wall 20 which extends right from the end of side wall 19 closer to the vehicle front and faces a transverse fitting face 14. The transverse wall 20 extends transversely of the longitudinal wall 17. The longitudinal wall 17, rear wall 18, side wall 19, and transverse wall 20 are integrally formed. The rear wall 18 and side wall 19 serve as a connecting wall 21 as a base which interconnects longitudinal wall 17 and transverse wall 20 with each other.

The longitudinal wall 17 includes two bolt-holes 22 through a portion closer to the vehicle front thereof with a vertical distance therebetween. The longitudinal wall 17 includes elongated hole 23 extending in the vehicle longitudinal direction on the vehicle rear of bolt-hole 22. The rear wall 18 includes an opened lever hole 24 extending vertically. The shift lever device 27 has rod 29 movable within lever hole 24. The rear wall 18 includes characters P, R, N, and D at the side of lever hole 24, the characters indicating respective range positions. The side wall 19 includes elongated hole 25 which is positioned to be opposite to elongated hole 23 of longitudinal wall 17 and extended in the vehicle longitudinal direction. The transverse wall 20 includes two upper and lower bolt-holes 28 therethrough, similarly to the longitudinal wall 17.

The device body 28 of shift lever device 27 is surrounded by the connecting wall 21 (18 and 19) and longitudinal wall 17, being located inside of them 21, 17. As shown in FIG. 2, the device body 28 includes fitting shafts 31 and 32 protruding left and right in a vehicle transverse direction. The fitting shafts 31 and 32 are fined into elongated holes 23 and 25 of longitudinal wall 17 and a side wall 19, respectively. The fitting shafts 31 and 32 have diameters larger than widths of elongated holes 23 and 25 of longitudinal wall 17 and side wall 19, with external threads formed on the circumferential surfaces thereof, respectively. With the fitting shafts 31 and 32 fitted into the elongated holes 23 and 25, the nuts 33 and 34 are screwed and fastened to fitting shafts 31 and 32, respectively. The screwing and fastening securely fixes device body 28 to fitting 16.

Figure 4:
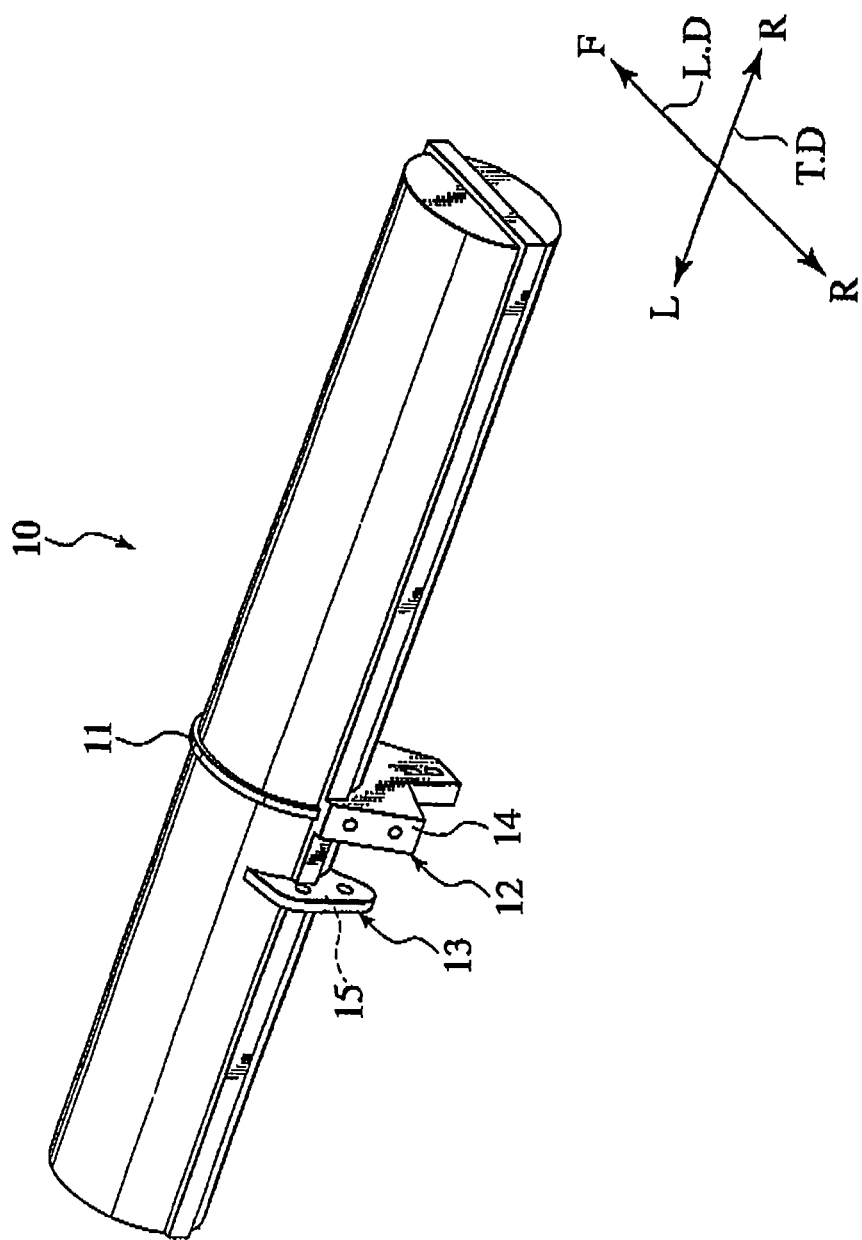
FIG. 4 is an enlarged perspective view showing a cross-car-beam for fixing the fitting in FIG. 1.

Referring to FIG. 4, cross-car-beam 10 fixes the fitting 16 for shift lever device 27. The cross-car-beam 10 extends in the vehicle transverse direction, with both longitudinal ends supported by a pillar portion (not shown) of a vehicle body by use of a not-shown bracket. The cress-car-beam 10 has a central portion in the vehicle transverse direction, the central portion having a rib 11 along the circumferential direction. The rib 11 has the first support 12 between the vehicle rear and the bottom end thereof. The first support 12 supports the shift lever fitting. The cross-car-beam 10 includes the second support 13 on the left of first support 12 with a predetermined distance therebetween.

The first support 12 includes a wide width along the vehicle transverse direction. The second support 13 extends in the vehicle longitudinal direction. The first support 12 includes a surface extending on the transverse fitting face 14 in the vehicle transverse direction. The second support 13 includes a side surface extending on longitudinal fitting face 15 in the vehicle longitudinal direction.

Figure 5:
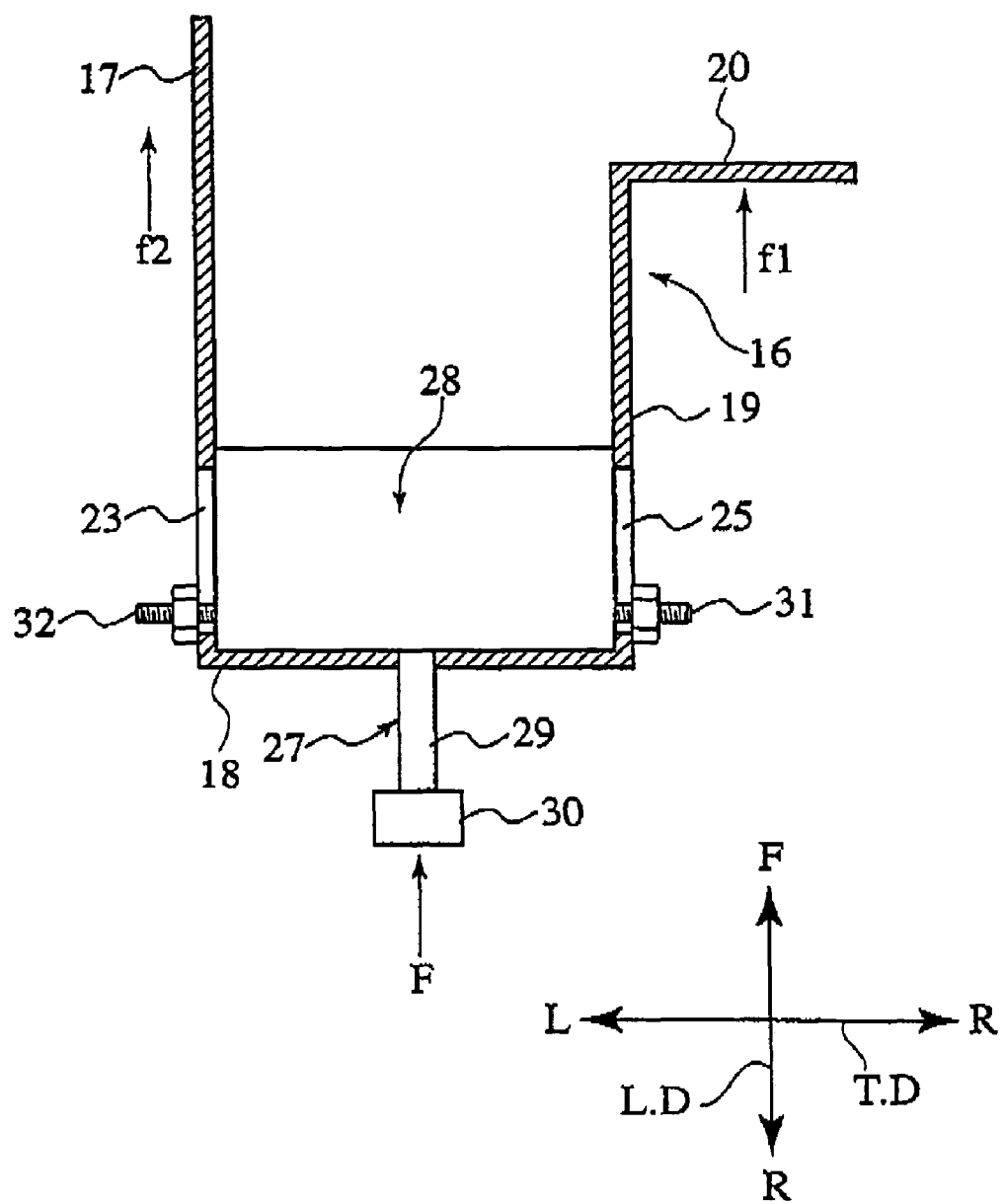
FIG. 5 is a schematic view of the shift lever assembly of FIG. 2 in a normal state when viewed from the top.
Figure 6:
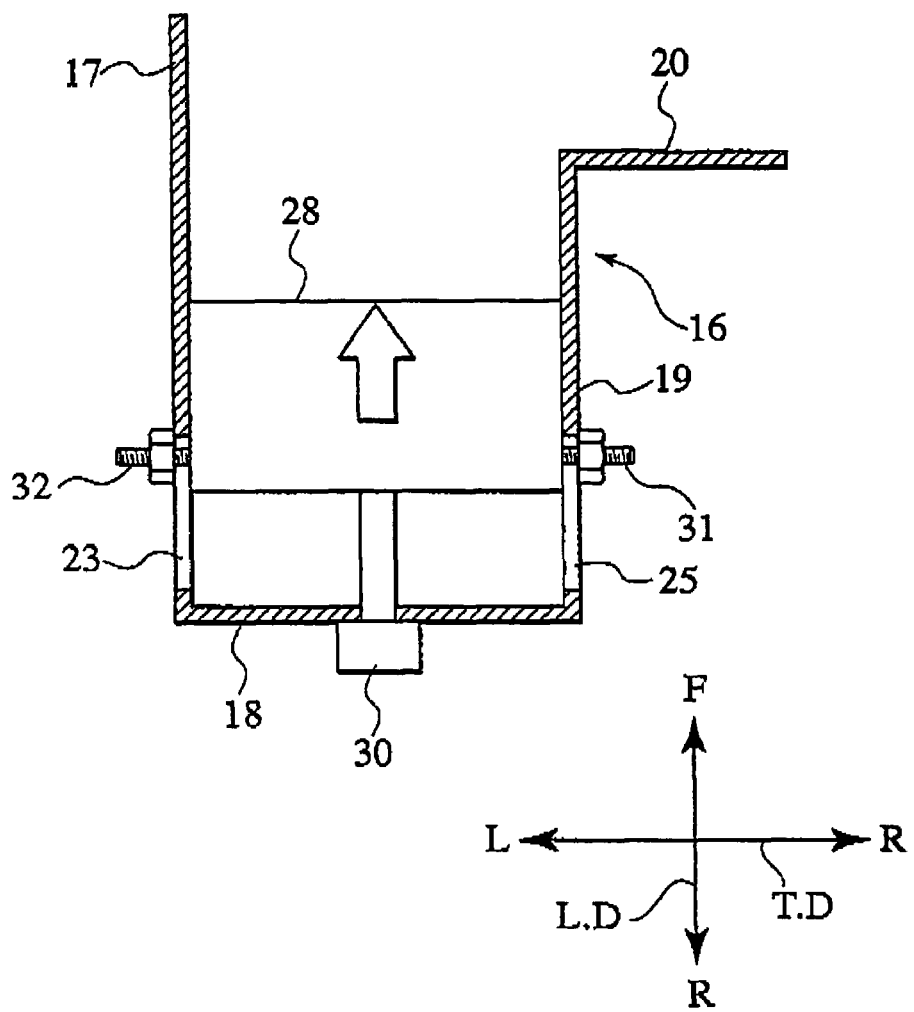
FIG. 6 is a schematic view of the shift lever assembly of FIG. 2 after the shift lever assembly is subjected to an excessive impact load when viewed from the top.

The operation of shift lever assembly will be described. FIGS. 5 and 6 are schematic views of fitting 16 and shift lever device 27 supported by fitting 16 as viewed from the top. FIG. 5 illustrates a shift lever assembly before shift lever device 27 is subjected to an excessive impact load from a driver or the like. FIG. 6 illustrates a shift lever assembly after shift lever device 27 is subjected to the excessive impact load.

As shown in FIG. 5, when an impact load F is applied to knob 80 of shift lever device 27 toward the vehicle front, impact load F is transmitted to device body 28 through rod 29. The device body 28 includes fitting shafts 31 and 32 fastened to fitting 16 by the bolts. As shown in FIG. 6, this allows movement of fitting shafts 81 and 82 toward the vehicle front within elongated holes 23 and 25 to efficiently absorb impact load F. Furthermore, as shown in FIG. 5, the impact load F is transmitted to fitting 16 to be separated into loads f1 and f2. The loads f1 and f2 are transmitted to transverse wall 20 and longitudinal wall 17, respectively. The transverse wall 20 is subject to load fi on a plane, and longitudinal wall 17 is subject to load f2 in the shear direction.

Figure 7:
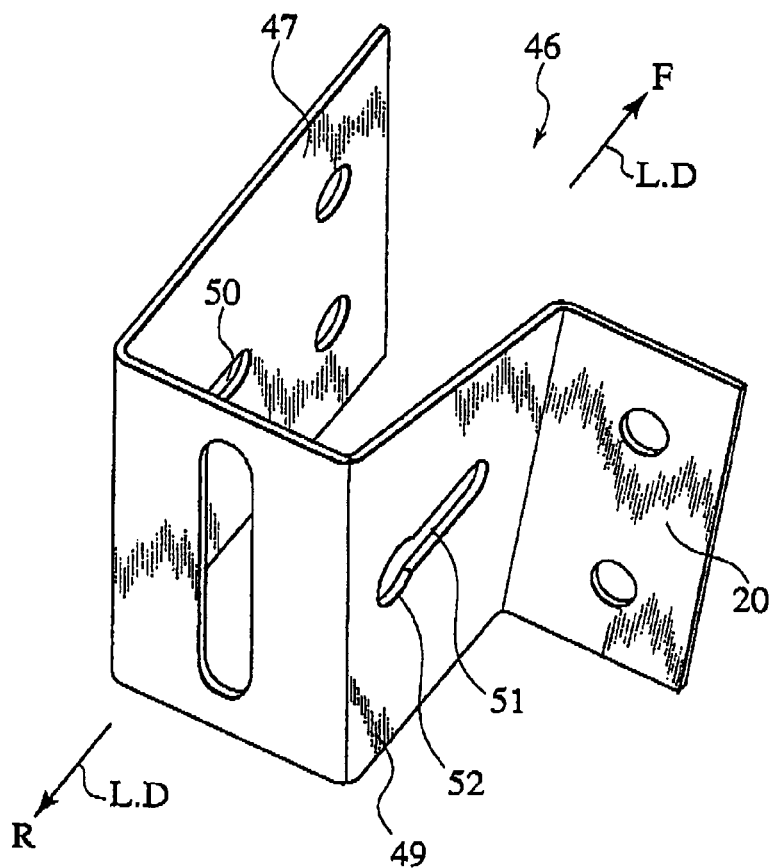
FIG. 7 is a perspective view showing a modified embodiment of the fitting of FIG. 3.
Figure 8:
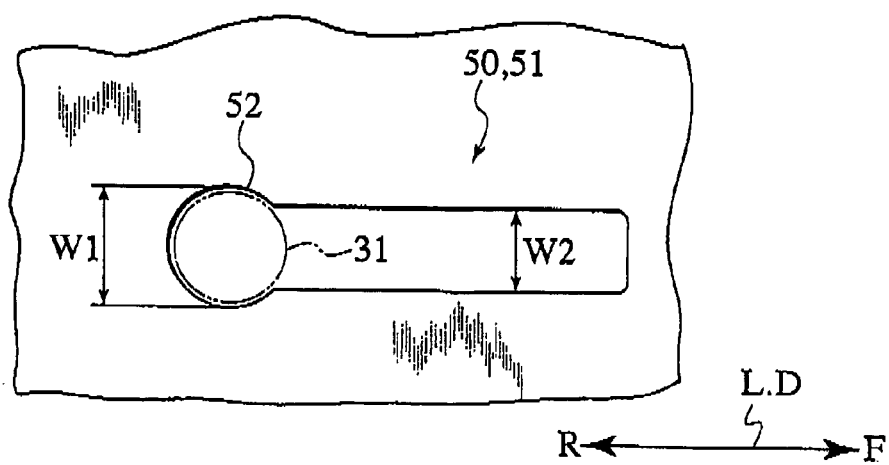
FIG. 8 is a plane view of an elongated hole of FIG. 7.

As shown in FIGS. 7 and 8, a modified embodiment has a fitting 46. The fitting 46 is modified in the shape of elongated holes 50 and 51 of longitudinal and side walls 47 and 49. Specifically, this modification means that a width W1 of a rear end 52 is increased, and that a width W2 on the vehicle front is designed to be smaller than width W1. The fitting of shaft 31 of device body 28 into rear end 52 allows the impact load to be more efficiently absorbed.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. The shift lever assembly comprising:
   a cross-car-beam extending in a vehicle transverse direction and including a support;
   a shift lever device having a device body and a rod being slidably supported by the device body; and
   a fitting configured to fix the shift lever device to the cross-car-beam;
   wherein the fitting comprises:
     a longitudinal wall extending in a vehicle longitudinal direction;
     a transverse wall extending in the vehicle transverse direction; and
     a connecting wall interconnecting the longitudinal wall and the transverse wall,
   wherein the support comprises:
     a longitudinal fitting face extending in the vehicle longitudinal direction and opposed to the longitudinal wall; and
     a transverse fitting face extending in the vehicle transverse direction and opposed to the transverse wall,
   wherein the longitudinal wall and the transverse wall are abutted on and fixed to the longitudinal fitting face and the transverse fitting face, respectively, wherein the connecting wall comprises:
   a rear wall continuous with a rear end of the longitudinal wall; and
   a side wall continuous with an inner side end of the transverse wall in the vehicle transverse direction and being opposed to the longitudinal wall,
wherein the shift lever comprises a device body positioned in an inside enclosed by the longitudinal wall, the transverse wall, and the connecting wall,
wherein the longitudinal wall and the side wall of the connecting wall define elongated holes extending in the vehicle longitudinal direction,
wherein the device body has fitting shafts protruding therefrom in the vehicle transverse direction,
wherein the fitting shafts are fitted in the elongated holes, fixing the device body to the fitting.

2. The shift lever assembly according to claim 1,
wherein the elongated holes have the rear ends with a width substantially identical to sizes of the fitting shafts,
wherein the elongated holes have front sides in front of the rear ends in the vehicle longitudinal direction,
the front sides are narrower in width than the rear ends,
wherein the fitting shafts are fitted in the rear ends of the elongated holes.

3. The shift lever assembly according to claim 1,
wherein the longitudinal wall, the transverse wall, and the connecting wall are integrated with each other.

4. The shift lever assembly according to claim 1,
wherein the cross-car-beam comprises a rib in a circumferential direction,
wherein the support is provided on the rib.

* * * * *